US011318505B2

(12) United States Patent
Wang

(10) Patent No.: US 11,318,505 B2

(45) Date of Patent: May 3, 2022

(54) MEDICINE POWDER CLEANING APPARATUS AND MEDICINE POWDER CLEANING METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Yu-Ting Wang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 338 days.

(21) Appl. No.: 16/744,299

(22) Filed: Jan. 16, 2020

(65) Prior Publication Data

US 2020/0147656 A1 May 14, 2020

Related U.S. Application Data

(62) Division of application No. 15/286,507, filed on Oct. 5, 2016, now Pat. No. 10,583,467.

(51) Int. Cl.

*B08B 5/02* (2006.01)

*B08B 9/032* (2006.01)

(Continued)

(52) U.S. Cl.

CPC .................. *B08B 5/02* (2013.01); *B08B 5/04* (2013.01); *B08B 9/0328* (2013.01); *G05D 16/208* (2013.01); *G05D 16/2066* (2013.01)

(58) Field of Classification Search

CPC ......... B08B 5/02; B08B 15/0082; B08B 5/04; B08B 9/0325; B08B 9/0328; G05D 16/2066

See application file for complete search history.

(56) References Cited

U.S. PATENT DOCUMENTS 10,457,427 B2 * 10/2019 De Boer ................ B65B 5/103

10,583,467 B2 * 3/2020 Wang ........................ B08B 5/02

FOREIGN PATENT DOCUMENTS

CN 103515270 A 1/2014

CN 104096688 A * 10/2014 ............... B08B 1/00

(Continued)

OTHER PUBLICATIONS

Iwasaki et al., Computer generated English translation of JP 2009-66135 A, Apr. 2009. (Year: 2009).*

(Continued)

*Primary Examiner* — Laura C Guidotti

(74) *Attorney, Agent, or Firm* — ScienBiziP, P.C.

(57) ABSTRACT

An apparatus for removing and cleaning medicine powder as residue from an automatic dispenser includes a pressure sensor, a positive pump, and a control module. The control module includes a control unit and a power supply unit. The pressure sensor detects a first pressing force to obtain a predetermined value. The pressure sensor detects a second pressing force in a first tube to obtain a first detection value. The control unit is configured to obtain a first difference value, and determine whether the same is within a reference range. The power supply unit supplies power to the positive pump if the first difference value is not within the reference range. The positive pump creates an airflow to blow the medicine powder out of the first tube when powered. A method for cleaning up medicine powder is also provided.

14 Claims, 5 Drawing Sheets

(51) Int. Cl.
*B08B 5/04* (2006.01)
*G05D 16/20* (2006.01)

(56) References Cited

FOREIGN PATENT DOCUMENTS

| | | | | | |
|---|---|---|---|---|---|
| CN | 204057223 U | | 12/2014 | | |
| JP | 2009-66135 A | * | 4/2009 | ................ | A61J 3/00 |

OTHER PUBLICATIONS

Zhan et al., Computer generated English translation of CN 104096688A, Oct. 2014. (Year: 2014).*

* cited by examiner

```
┌─────────────────────────────────────────┐ ╭─ 501
│  The negative pump is turned off, the   │
│  control unit controls the positive pump│
│  and the solenoid valve to turn on      │
└─────────────────────────────────────────┘
                    │
                    ▼                       ╭─ 502
┌─────────────────────────────────────────┐
│       The solenoid valve controls the   │
│      airflow in the second tube to flow │
└─────────────────────────────────────────┘
                    │
                    ▼                       ╭─ 503
┌─────────────────────────────────────────┐
│  The positive pump creates the airflow to blow │
│  a medicine powder out to the outputting│
│  device from the opening of the first tube │
└─────────────────────────────────────────┘
```

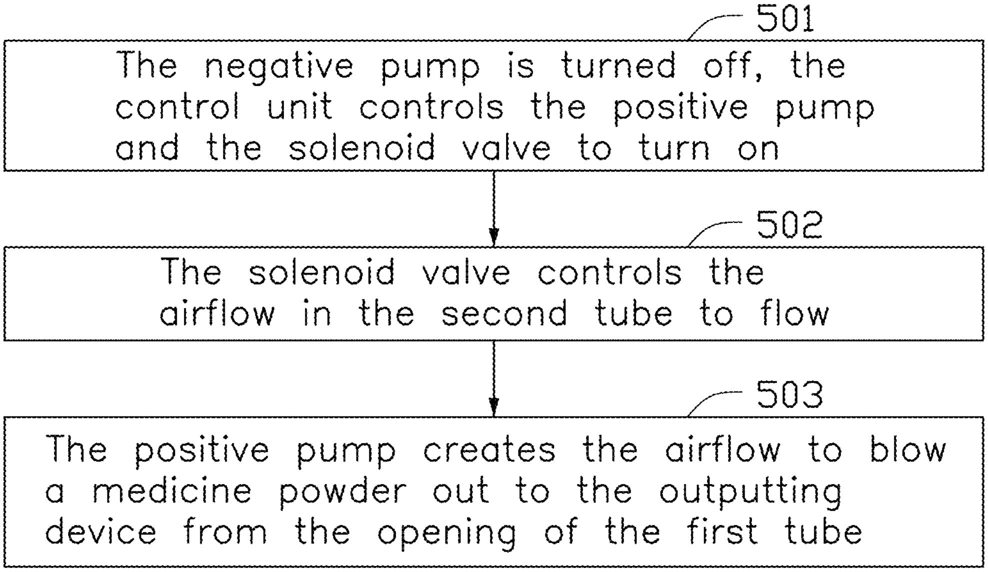

FIG. 5

MEDICINE POWDER CLEANING APPARATUS AND MEDICINE POWDER CLEANING METHOD

FIELD

The subject matter herein generally relates to a cleaning apparatus for cleaning medicine powder.

BACKGROUND

A device for automatically dispensing medicine reaches a medicine box through a mechanical arm, to suck or grasp tablets. The mechanical arm may accumulate powder and other residue from the tablets which can contaminate the next tablets to be dispensed.

Therefore, there is a room for improvement.

BRIEF DESCRIPTION OF THE DRAWINGS

Implementations of the present technology will now be described, by way of embodiments, with reference to the attached figures.

FIG. 5 is a sub-flowchart of block 500 of the method of FIG. 3.

DETAILED DESCRIPTION

Figure 1:
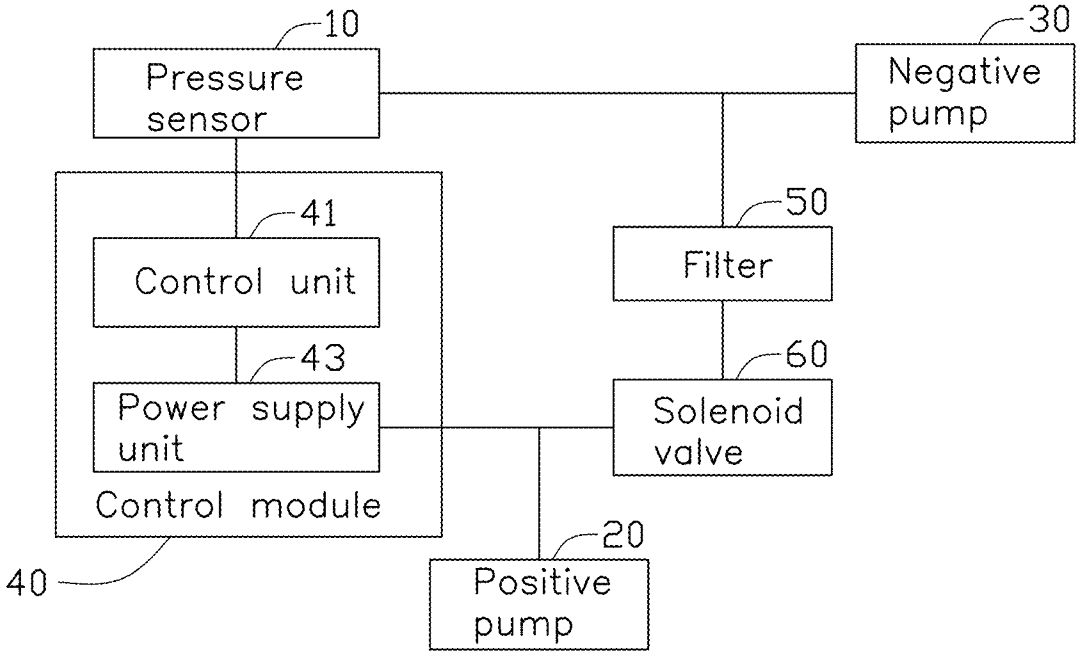
FIG. 1 is a block diagram of one embodiment of an apparatus for cleaning up medicine powder.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a cleaning apparatus for cleaning and unblocking compacted medicine powder in an automatic picking-medicine system.

FIG. 1 illustrates a medicine powder cleaning apparatus in accordance with an embodiment of the present disclosure. The medicine powder cleaning apparatus comprises a pressure sensor 10, a positive pump 20, a negative pump 30, a control module 40, a filter 50, and a solenoid valve 60. The control module 40 comprises a control unit 41 and a power supply unit 43. The pressure sensor 10 is electrically connected to the control unit 41. The control unit 41 is electrically connected to the power supply unit 43. The power supply unit 43 is electrically connected to the positive pump 20 and the solenoid valve 60. The control unit 41 controls the power supply unit 43 in supplying power to the positive pump 20 and the solenoid valve 60.

Figure 2:
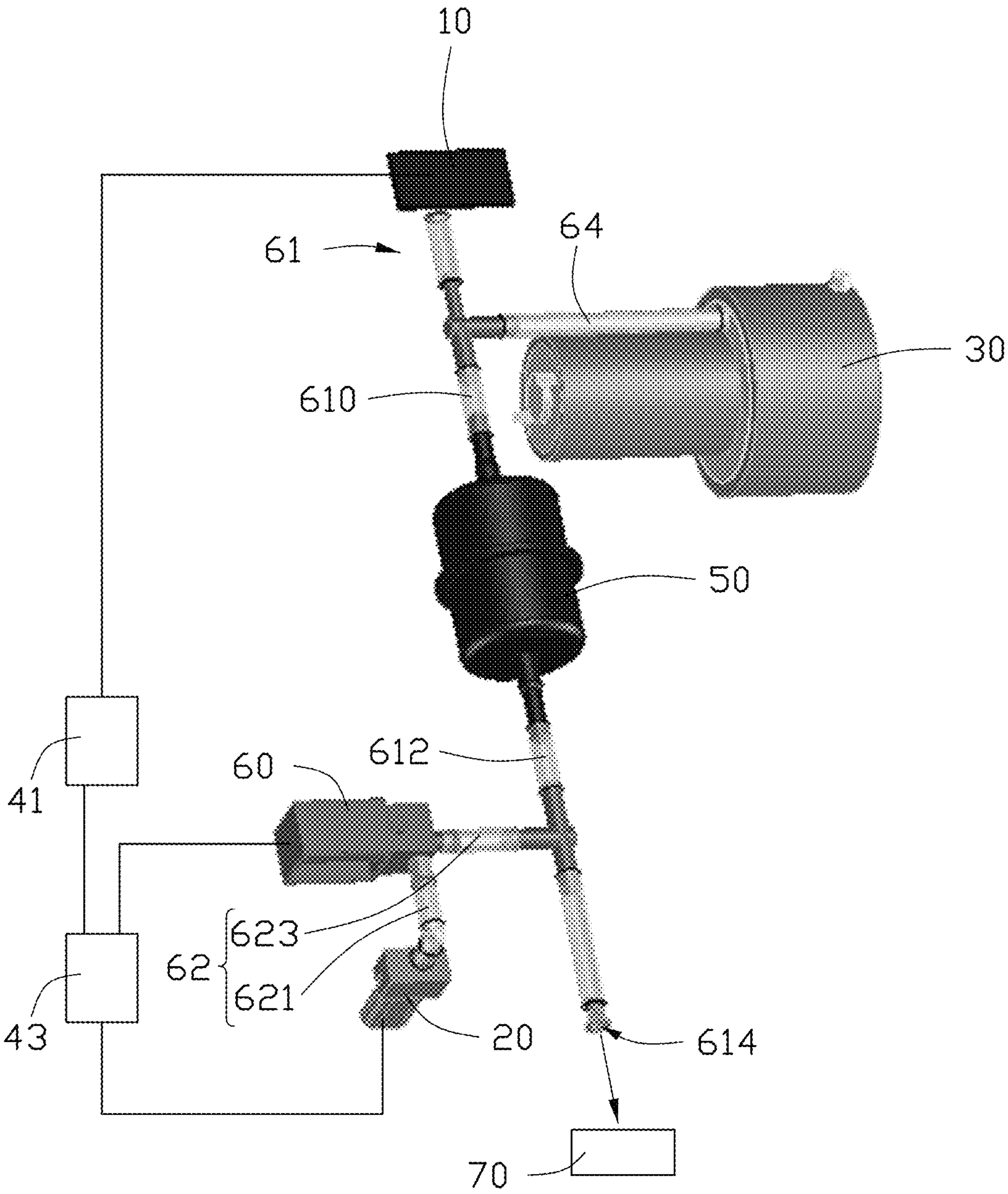
FIG. 2 is a diagrammatic view of the apparatus of FIG. 1.

FIG. 2 illustrates that the pressure sensor 10 is coupled to one terminal of a first connecting portion 610 of a first tube 61. The other terminal of the first connecting portion 610 of the first tube 61 is coupled to one terminal of the filter 50. The other terminal of the filter 50 is coupled to one terminal of a second connecting portion 612 of the first tube 61. The other terminal of the second connecting portion 612 of the first tube 61 defines an opening 614. The opening 614 is coupled to an outputting device 70. The outputting device 70 outputs medicine powder.

The positive pump 20 is coupled to one terminal of the solenoid valve 60 through a first portion 621 of a second tube 62. The other terminal of the solenoid valve 60 is coupled to the second connecting portion 612 of the first tube 61 through a second portion 623 of the second tube 62. The first portion 621 of the second tube 62 extends through the second portion 623 of the second tube 62. The second portion 623 of the second tube 62 extends through the second connecting portion 612 of the first tube 61. The negative pump 30 is coupled to the first connecting portion 610 of the first tube 61 through a third tube 64. The third tube 64 extends through the first connecting portion 610 of the first tube 61.

The filter 50 filters out medicine powder of the first tube 61 to avoid the third tube 64 being choked by the medicine powder.

Before activation of the positive pump 20 and the solenoid valve 60, the control unit 41 prevents the power supply unit 43 supplying power to the positive pump 20 and the solenoid valve 60. The positive pump 20 and the solenoid valve 60 are thus in a non-working state, and the solenoid valve 60 does not control airflow in the second tube 62. The pressure sensor 10 is configured to detect a first pressing force in the first tube 61 before a medication is selected by a user. The pressure sensor 10 is also configured to convert the first pressing force to a first signal and then the first signal to a predetermined value. The pressure sensor 10 is further configured to obtain the predetermined value. Selection of medication can begin after the pressure sensor 10 obtains the predetermined value. In detail, when the negative pump 30 is turned on, the selection can be made. The negative pump 30 is turned off to be in a non-working state after selection and delivery of a medication. After delivery of a selected medication, the pressure sensor 10 is configured to detect a second pressing force in the first tube 61, convert the second pressing force to a second signal and then the second signal to a first detection value, and the first detection value is obtained. The control unit 41 is configured to obtain the predetermined value and the first detection value from the pressure sensor 10, and store the predetermined value and the first detection value. A first difference value between the predetermined value and the first detection value is obtained, and a determination is made as to whether the first difference value is within a reference range. A first cleaning process begins when the control unit 41 determines that the first difference value is not within the reference range. In one embodiment, the reference range is from 0 to 150.

In detail, the first cleaning process operates as follows: the control unit 41 turns on the positive pump 20 and the solenoid valve 60, the control unit 41 controls the power supply unit 43 to supply power to the positive pump 20 and the solenoid valve 60, and the positive pump 20 and the solenoid valve 60 are thus in a working state. The solenoid valve 60 opens the second tube 62, thereby an airflow can flow into the second tube 62, and the positive pump 20 creates airflow to blast any medicine powder out to the outputting device 70 from the opening 614 of the first tube 61.

After the first cleaning process is finished, the control unit 41 is further configured to count the number of times that the positive pump 20 and the solenoid valve 60 are turned on. When the control unit 41 determines the number of times is greater than a reference value, the pressure sensor 10 detects a third pressing force in the first tube 61, converts the third pressing force to a third signal and then the third signal to a second detection value, and the second detection value is obtained. The control unit 41 is configured to obtain the second detection value from the pressure sensor 10, store the second detection value, obtain a second difference value between the predetermined value and the second detection value, and determine whether the second difference value is within the reference range. A second cleaning process begins when the control unit 41 determines that the second difference value is not within the reference range. In one embodiment, the reference value is 2.

When the power supply unit 43 supplies power to the positive pump 20 and the solenoid valve 60, the positive pump 20 and the solenoid valve 60 are in the working state. The solenoid valve 60 thus opens the second tube 62, thereby enabling the positive pump 20 to create the airflow to blast the medicine powder out to the outputting device 70 from the opening 614 of the first tube 61.

Figure 3:
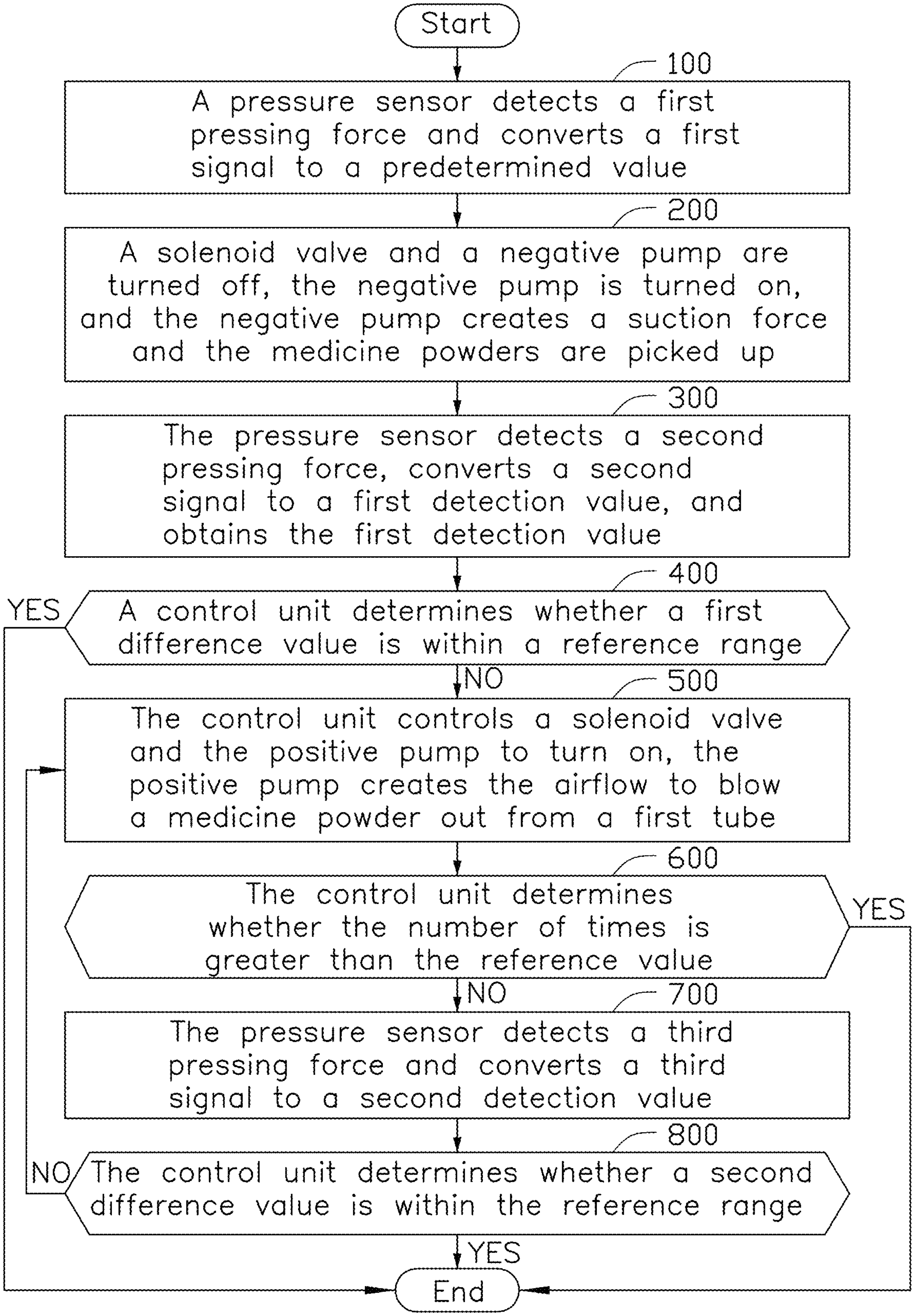
FIG. 3 is a flowchart of one embodiment of a method for cleaning up powder residue.
Figure 4:
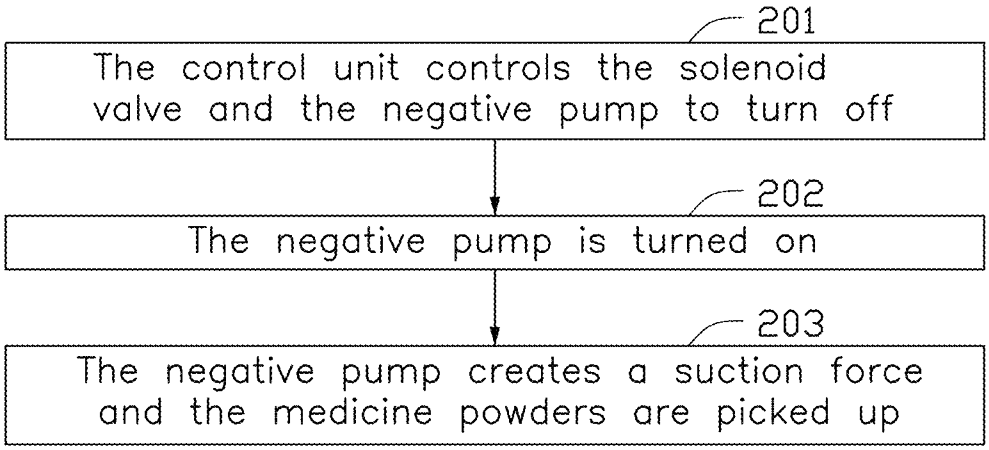
FIG. 4 is a sub-flowchart of block 200 of the method of FIG. 3.

FIGS. 3-5 illustrate a flowchart of a method in accordance with an example embodiment. A medicine powder cleaning method is provided by way of example, as there are a variety of ways to carry out the method. The medicine powder cleaning method described below can be carried out using the configurations illustrated in FIGS. 1-2, for example, and various elements of these figures are referenced in explaining medicine powder cleaning method. The illustrated order of blocks is by example only and the order of the blocks can be changed. Additional blocks may be added or fewer blocks may be utilized without departing from this disclosure. The medicine powder cleaning method can begin at block 100.

At block 100, the pressure sensor 10 detects a first pressing force in the first tube 61, converts the first pressing force to a first signal and then the first signal to a predetermined value, and obtains the predetermined value.

At block 200, the solenoid valve 60 and the negative pump 30 are turned off and the negative pump 30 is turned on. The negative pump 30 creates a suction force and the medicine powders are picked up.

At block 300, the pressure sensor 10 detects a second pressing force in the first tube 61, converts a second signal corresponding to the second pressing force to a first detection value, and obtains the first detection value.

At block 400, the control unit 41 obtains the predetermined value and the first detection value from the pressure sensor 10, obtains a first difference value between the predetermined value and the first detection value, and determines whether the first difference value is within a reference range. If the first difference value is within the reference range, the method terminates, otherwise block 500 is implemented.

At block 500, the control unit 41 controls the solenoid valve 60 and the positive pump 20 to turn on, thereby enabling the positive pump 20 to create airflow to blast medicine powder out from the first tube 61.

At block 600, the control unit 41 counts the number of times that the solenoid valve 60 and the positive pump 20 are continuously turned on, determines whether the number of times is greater than a reference value. If the number of times is greater than the reference value, block 700 is implemented, otherwise the method terminates.

At block 700, the pressure sensor 10 detects a third pressing force in the first tube 61, converts a third signal corresponding to the third pressing force to a second detection value, and obtains the second detection value.

At block 800, the control unit 41 obtains the second detection value from the pressure sensor 10, obtains a second difference value between the predetermined value and the second detection value, and determines whether the second difference value is within the reference range. If the second difference value is within the reference range, the method terminates, otherwise returns to block 500.

FIG. 4 illustrates a flowchart of the picking block 200 of the medicine powder cleaning method of FIG. 3. The picking block 200 can begin at block 201.

At block 201, the control unit 41 turns off the solenoid valve 60 and the negative pump 30. In detail, the control unit 41 controls the power supply unit 43 to not supply power to the positive pump 20 and the solenoid valve 60.

At block 202, the negative pump 30 is turned on.

At block 203, the negative pump 30 creates a suction force and the medicine powders are picked up.

FIG. 5 illustrates a flowchart of the cleaning block 500 of the medicine powder cleaning method of FIG. 3. The cleaning block 500 can begin at block 501.

At block 501, the negative pump 30 is turned off, the control unit 41 turns on the positive pump 20 and the solenoid valve 60. In detail, the control unit 41 controls the power supply unit 43 to supply power to the positive pump 20 and the solenoid valve 60.

At block 502, the solenoid valve 60 controls the airflow in the second tube 62 to flow.

At block 503, the positive pump 20 creates airflow to blast the medicine powder out to the outputting device 70 from the opening 614 of the first tube 61.

In the embodiment, the pressure sensor 10 is configured to detect gas pressure in the first tube 61. The control unit 41 determines whether medicine powder is in the first tube 61 by determining whether a difference value compared to the predetermined value is within a reference range, thereby turning on the positive pump 20 and the solenoid valve 60 to clean the first tube 61, thus avoiding the third tube 64 being choked by the medicine powder.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A medicine powder cleaning apparatus comprising:

a pressure sensor coupled to a first tube;

a positive pump; and a control module comprising:

a control unit connected electrically to the pressure sensor, and a power supply unit connected electrically to the control unit and the positive pump;

wherein the pressure sensor is configured to detect a first pressing force in the first tube to obtain a first detection value;

wherein the control unit is configured to:

store a predetermined value, obtain a first difference value between the predetermined value and the first detection value, determine whether the first difference value is within a reference range, and control the power supply unit to supply power to the positive pump when the first difference value is not within the reference range;

wherein the positive pump is configured to create airflow to blow medicine powder out after being supplied power by the power supply unit.

2. The medicine powder cleaning apparatus of claim 1, further comprising a solenoid valve, wherein the power supply unit is electrically connected to the solenoid valve, the control unit is also configured to control the power supply unit to supply power to the solenoid valve when the first difference value is not in the reference range.

3. The medicine powder cleaning apparatus of claim 2, wherein a second portion of a second tube is coupled between the solenoid valve and the first tube, a first portion of the second tube is coupled between the solenoid valve and the positive pump, and the solenoid valve is configured to control airflow in the second tube to flow after being supplied power by the power supply unit.

4. The medicine powder cleaning apparatus of claim 3, further comprising a negative pump, wherein the negative pump is coupled to the first tube through a third tube, the pressure sensor is configured to detect a second pressing force in the first tube to obtain the predetermined value before the negative pump is turned on, the control unit is configured to obtain the predetermined value from the pressure sensor, and the negative pump is configured to be turned on after the pressure sensor obtains the predetermined value.

5. The medicine powder cleaning apparatus of claim 2, wherein the pressure sensor is coupled to a first connecting portion of the first tube, the solenoid valve is coupled to a second connecting portion of the first tube.

6. The medicine powder cleaning apparatus of claim 5, further comprising a filter, wherein the pressure sensor is coupled a first terminal of the first connecting portion of the first tube, a second terminal of the first connecting portion of the first tube is coupled to a first terminal of the filter, a second terminal of the filter is coupled to a first terminal of the second connecting portion of the first tube.

7. The medicine powder cleaning apparatus of claim 6, wherein a second terminal of the second connecting portion of the first tube defines an opening, the opening is coupled to an outputting device, and the outputting device is configured to output the medicine powder.

8. The medicine powder cleaning apparatus of claim 5, wherein the pressure sensor is further configured to detect a first pressing force in the first tube to obtain the first detection value after a negative pump is turned off.

9. A medicine powder cleaning apparatus comprising:

a pressure sensor coupled to a first tube;

a negative pump coupled to the pressure sensor;

a positive pump; and a control module comprising:

a control unit connected electrically to the pressure sensor, and a power supply unit connected electrically to the control unit and the positive pump;

wherein the pressure sensor is configured to:

detect a first pressing force in the first tube to obtain a predetermined value when the positive pump is in a working state, and detect a second pressing force in the first tube to obtain a first detection value when the negative pump is in a non-working state from a working state;

wherein the control unit is configured to:

obtain the predetermined value and the first detection value, obtain a first difference value between the predetermined value and the first detection value, determine whether the first difference value is within a reference range, and control the power supply unit to supply power to the positive pump when the first difference value is not within the reference range;

wherein the positive pump is configured to create airflow to blow medicine powder out after being supplied power by the power supply unit.

10. The medicine powder cleaning apparatus of claim 9, further comprising a solenoid valve, wherein the power supply unit is electrically connected to the solenoid valve, the control unit is also configured to control the power supply unit to supply power to the solenoid valve when the first difference value is not within the reference range.

11. The medicine powder cleaning apparatus of claim 10, wherein a second portion of a second tube is coupled between the solenoid valve and the first tube, a first portion of the second tube is coupled between the solenoid valve and the positive pump, and the solenoid valve is configured to control airflow in the second tube to flow after being supplied power by the power supply unit.

12. The medicine powder cleaning apparatus of claim 9, wherein picking medicine begins when the negative pump is turned on to be in the working state.

13. The medicine powder cleaning apparatus of claim 12, wherein the negative pump is turned off to be in the non-working state after medicine is picked.

14. The medicine powder cleaning apparatus of claim 13, wherein the control unit prevents the power supply unit supplying power to the positive pump when the positive pump is in the working state.

* * * * *

UNITED STATES PATENT AND TRADEMARK OFFICE
CERTIFICATE OF CORRECTION

PATENT NO. : 11,318,505 B2
APPLICATION NO. : 16/744299
DATED : May 3, 2022
INVENTOR(S) : Yu-Ting Wang It is certified that error appears in the above-identified patent and that said Letters Patent is hereby corrected as shown below:

On the Title Page

Please add Item (30) regarding "Foreign Application Priority Data" with the following:
(30) Foreign Application Priority Data
Sep. 9, 2016(CN).............201610811377.4

Signed and Sealed this
Second Day of July, 2024

Katherine Kelly Vidal
*Director of the United States Patent and Trademark Office*